United States Patent
Meliou et al.

(10) Patent No.: US 10,691,585 B2
(45) Date of Patent: Jun. 23, 2020

(54) EFFICIENT SOFTWARE TESTING SYSTEM

(71) Applicant: THE UNIVERSITY OF MASSACHUSETTS, Boston, MA (US)

(72) Inventors: Alexandra Meliou, Amherst, MA (US); Yuriy Brun, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 12 days.

(21) Appl. No.: 16/205,473

(22) Filed: Nov. 30, 2018

(65) Prior Publication Data

US 2019/0163614 A1   May 30, 2019

Related U.S. Application Data

(60) Provisional application No. 62/592,582, filed on Nov. 30, 2017.

(51) Int. Cl.
*G06F 11/36* (2006.01)
(52) U.S. Cl.
CPC ...... *G06F 11/3684* (2013.01); *G06F 11/3672* (2013.01); *G06F 11/3688* (2013.01)
(58) Field of Classification Search
CPC ............ G06F 11/3672; G06F 11/3684; G06F 11/3688
See application file for complete search history.

(56) References Cited

U.S. PATENT DOCUMENTS

2007/0240113 A1* 10/2007 Rosaria ............... G06F 8/10
                                                                   717/124
2008/0215921 A1*  9/2008 Branca ............. G06F 11/3688
                                                                   714/38.14

OTHER PUBLICATIONS

A. Datta, et al., Algorithmic Transparency via Quantitative Input Influence: Theory and Experiments with Learning Systems, 2016 IEEE Symposium on Security and Privacy (SP), May 22-26, 2016, 20 pages.

(Continued)

*Primary Examiner* — Wei Y Zhen
*Assistant Examiner* — Amir Soltanzadeh
(74) *Attorney, Agent, or Firm* — Cantor Colburn LLP (57) ABSTRACT

A system includes a memory system having computer readable instructions and one or more processors for executing the computer readable instructions. The computer readable instructions include identifying input characteristic subsets for a system under test based on an input schema, generating discrimination test cases including a combination of inputs for the system under test based on the input characteristic subsets, and performing a pruning operation to reduce a number of the discrimination test cases based on identifying a superset of input characteristics that includes at least one of the input characteristic subsets having a discrimination score above a threshold value. The computer readable instructions further include determining discrimination scores based on applying one or more of the discrimination test cases remaining after the pruning operation to the system under test and observing an output, and outputting a measurement of discrimination of the system under test based on the discrimination scores.

20 Claims, 5 Drawing Sheets

(56) References Cited

OTHER PUBLICATIONS

F. Tramer, et al., FairTest: Discovering Unwarranted Associations in Data-Driven Applications, 2017 IEEE European Symposium on Security and Privacy, Apr. 26-28, 2017, 16 pages.
S. Galhotra, et al., Fairness Testing: Testing Software for Discrimination, ESEC/FSE'17, Sep. 4-8, 2017, 13 pages.
S. Prabhumoye, et al., "Style Transfer Through Back-Translation." In Proceedings of the 56th Annual Meeting of the Association for Computational Linguistics (ACL), 2018, pp. 866-876.
T. Shen, et al. "Style Transfer from Non-Parallel Text by Cross-Alignment." In Proceedings of the 31st Conference on Neural Information Processing Systems (NIPS), 2017.
Y. Choi, et al., "StarGAN: Unified Generative Adversarial Networks for Multi-Domain Image-to-Image Translation." In Proceedings of the IEEE Conference on Computer Vision and Pattern Recognition (CVPR), 2018, pp. 8789-8797.

\* cited by examiner

CausalDiscrimination($S$, $X'$, conf, $\epsilon$)
1. count ← 0; $r$ ← 0, testSuite ← ∅   ▷ Initialization
2. while $r$ < MAX_SAMPLES do
3.     $r \leftarrow r + 1$
4.     $k_0 \leftarrow$ NewRandomInput   ▷ New input without value restrictions
5.     testSuite ← testSuite ∪ $\{k_0\}$   ▷ Add input to the test suite
6.     if notCached($k_0$) then   ▷ No cached executions of $k_0$ exist
7.       Compute($S(k_0)$)   ▷ Evaluate software on input $k_0$
8.       CacheResult($k_0$, $S(k_0)$)   ▷ Cache the result
9.     else   ▷ Retrieve cached result
10.       $S(k_0) \leftarrow$ RetrieveCached($k_0$)
11.     foreach $k \in \{k \mid k \neq k_0; \forall \chi \notin X', k.\chi = k_0.\chi\}$ do
          ▷ All inputs that match $k_0$ in every characteristic $\chi \notin X'$
12.       testSuite ← testSuite ∪ $\{k\}$   ▷ Add input to the test suite
13.       if notCached($k$) then   ▷ No cached executions of $k$ exist
14.         Compute($S(k)$)   ▷ Evaluate software on input $k$
15.         CacheResult($k$, $S(k)$)   ▷ Cache the result
16.       else   ▷ Retrieve cached result
17.         $S(k) \leftarrow$ RetrieveCached($k$)
18.       if $S(k) \neq S(k_0)$ then   ▷ Causal discrimination
19.         count = count + 1
20.         break
21.     if $r$ > SAMPLING_THRESHOLD then
          ▷ Once we have sufficient samples, check error margin
22.       $p \leftarrow \frac{count}{r}$   ▷ Current proportion of positive outputs
23.       if conf.zValue$\sqrt{\frac{p(1-p)}{r}} < \epsilon$ then
24.         break   ▷ Achieved error < $\epsilon$, with confidence conf
25. return testSuite, $\vec{d}_{X'}(S) \leftarrow p$

```
DISCRIMINATIONSEARCH(𝕊, θ, conf, ε)
1   D ← ∅                              ▷ Initialize discriminating subsets of characteristics
2   for i = 1 ... |X| do
3       foreach X' ⊆ X, |X'| = i do                    ▷ Check subsets of size i
4           discriminates ← false
5           for X'' ∈ D do
6               if X'' ⊆ X' then
                        ▷ Supersets of a discriminating set discriminate
                        (Theorems 4.1 and 4.2)
7                   discriminates ← true
8                   break 9           if discriminates then
10              continue    ▷ Do not store X'; D already contains a subset
11          {testSuite, d} = DISCRIMINATION(𝕊, X', conf, ε)
                ▷ Test 𝕊 for (group or causal) discrimination with respect to X'
12          if d > θ then                  ▷ X' is a minimal discriminating set
13              D.append(X')
```

EFFICIENT SOFTWARE TESTING SYSTEM

CROSS-REFERENCE TO RELATED APPLICATION

This application claims the benefit of priority to U.S. Provisional Application No. 62/592,582 filed Nov. 30, 2017, the disclosure of which is incorporated herein by reference in its entirety.

STATEMENT REGARDING FEDERALLY SPONSORED RESEARCH OR DEVELOPMENT

This invention was made with government support under grants CCF-1453474, U.S. Pat. No. 1,453,543, and CNS-1744471 awarded by the National Science Foundation. The government may have certain rights in the invention.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE(S): "Fairness Testing: Testing Software for Discrimination", Sainyam Galhotra, Yuriy Brun, Alexandra Meliou, Sep. 4, 2017, 13 pages.

BACKGROUND

The subject matter disclosed herein relates generally to software test systems, and more particularly to efficient automated test case generation and reduction.

Software systems can incorporate many algorithms and apply rules that are created and adjusted over a period of time. Software systems can include tens of thousands of lines of code, resulting in a high degree of complexity. Some software systems dynamically adjust rules used to make decisions as patterns are observed over many interactions. Due to the size, complexity, and adaptive rules that can be applied to decision making algorithms, software systems can be challenging to test.

Testing software systems as a black box, where inputs are varied and outputs are observed, can be an effective approach to observing responses to various inputs. However, the number of test cases needed for a "brute force" approach can be massive to test every possible input combination and observe the corresponding outputs. Even if every possible combination is attempted, it may be difficult to draw meaningful conclusions from the large volume of results and understand whether the software system is performing as intended.

SUMMARY

Embodiments of the present invention include systems, methods, and computer program products for software testing. A non-limiting example system includes a memory system having computer readable instructions and one or more processors for executing the computer readable instructions. The computer readable instructions include identifying input characteristic subsets for a system under test based on an input schema, generating discrimination test cases including a combination of inputs for the system under test based on the input characteristic subsets, and performing a pruning operation to reduce a number of the discrimination test cases based on identifying a superset of input characteristics that includes at least one of the input characteristic subsets having a discrimination score above a threshold value. The computer readable instructions further include determining discrimination scores based on applying one or more of the discrimination test cases remaining after the pruning operation to the system under test and observing an output, and outputting a measurement of discrimination of the system under test based on the discrimination scores.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 illustrates a causal discrimination determination process in accordance with one or more embodiments;

The diagrams depicted herein are illustrative. There can be many variations to the diagram or the operations described therein without departing from the spirit of the invention. For instance, the actions can be performed in a differing order or actions can be added, deleted or modified. All of these variations are considered a part of the specification.

DETAILED DESCRIPTION

Exemplary embodiments of the present invention are directed to testing software systems for discrimination in response to a combination of inputs. A discrimination testing system can efficiently generate test cases to characterize performance of a system under test. Results of the characterization may trigger a design change activity to modify the system under test. Embodiments improve computer system performance by reducing a number of test cases needed to be generated, executed, stored, and analyzed. For example, test case pruning can reduce the number of needed test cases by two to three orders of magnitude while meeting performance goals. Embodiments capture causal relationships between inputs and outputs for a system under test to identify which combination of inputs result in deviations from results of similar combinations of inputs. In some instances, discrimination may be a desirable result, such as in automated product inspection for a manufacturing line or identifying objects for an automated control system. In other instances, discrimination is considered unfavorable, such as in providing different levels of service or access to resources based on personal characteristics.

As one example, suppose a bank employs LOAN software to decide if loan applicants should be given loans.

LOAN inputs can include each applicant's name, age, race, income, savings, employment status, and requested loan amount, and the output may be a binary "give loan" or "do not give loan". For simplicity, suppose age and race are binary, with age either <40 or >40, and race either green or purple.

Some prior work on measuring and removing discrimination from algorithms has focused on "group discrimination", which indicates that to be fair with respect to an input characteristic, the distribution of outputs for each group should be similar. For example, the LOAN software is fair with respect to age if it gives loans to the same fractions of applicants <40 and >40. To be fair with respect to multiple characteristics, for example, age and race, all groups with respect to those characteristics—purple <40, purple >40, green <40, and green >40—should have the same outcome fractions. A Calders-Verwer (CV) score can measure the strength of group discrimination as the difference between the largest and the smallest outcome fractions; if 30% of people <40 get the loan, and 40% of people >40 get the loan, then LOAN is 40%–30%=10% group discriminating.

While group discrimination can be reasoned about and measured, it has at least two inherent limitations. First, group discrimination may fail to observe some discrimination. For example, suppose that LOAN produces different outputs for two loan applications that differ in race, but are otherwise identical. While LOAN clearly discriminates with respect to race, the group discrimination score will be 0 if LOAN discriminates in the opposite way for another pair of applications. Second, software may circumvent discrimination detection. For example, suppose LOAN recommends loans for a random 30% of the purple applicants, and the 30% of the green applicants who have the most savings. Then the group discrimination score with respect to race will deem LOAN perfectly fair, despite a clear discrepancy in how the applications are processed based on race.

To address these issues, a new measure of discrimination is defined. Software testing can enable a unique opportunity to conduct causal experiments to determine statistical causation between inputs and outputs. For example, it is possible to execute LOAN on two individuals identical in every way except race, and verify if changing the race causes a change in the output. Causal discrimination indicates that to be fair with respect to a set of characteristics, the software must produce the same output for every two individuals who differ only in those characteristics. For example, the LOAN software is fair with respect to age and race if for all pairs of individuals with identical name, income, savings, employment status, and requested loan amount but different race or age characteristics, LOAN either gives all of them or none of them the loan. The fraction of inputs for which software causally discriminates is a measure of causal discrimination.

Thus far, the full input domain, e.g., every possible loan application, has been considered. However, applying a system under test to partial input domains may mask or effect discrimination. For example, while the system under test may discriminate on some loan applications, a bank may care about whether the system under test discriminates only with respect to applications representative of their customers, as opposed to all possible human beings. In this case, a partial input domain may mask discrimination. If a partial input domain exhibits correlation between input characteristics, it can effect discrimination. For example, suppose older individuals have, on average, higher incomes and larger savings. If LOAN only considers income and savings in making its decision, even though it does not consider age, for this population, LOAN gives loans to a higher fraction of older individuals than younger ones. The measurement of group or causal discrimination on a partial input domain may also be referred to as "apparent discrimination". Apparent discrimination depends on the operational profile of system usage.

In an analysis process, the system under test can be viewed as a black box that maps input characteristics to an output characteristic. While the system under test can be, in general, more complex, for the purposes of testing, without loss of generality, this definition is sufficient: All user actions and environmental variables are modeled as input characteristics, and each effect is modeled as an output characteristic. In embodiments where the system under test has multiple output characteristics, analysis can be performed with respect to each output characteristic separately. The definitions can be extended to include multiple output characteristics without significant conceptual reformulation. The input characteristics and the output characteristic can be defined as categorical variables, each having a set of possible values (e.g., race, gender, eye color, age ranges, income ranges). This constraint simplifies the measure of causality. While the definitions do not apply directly to non-categorical input and output characteristics (such as continuous variables, e.g., data types of int and double), the processes disclosed herein can be applied to systems under test with non-categorical input and output characteristics by using binning (e.g., age<40 and age>40). An output domain distance function (as further described herein) illustrates one way our definitions can be extended to continuous variables. Some embodiments extend the discrimination measures directly to a broader class of data types.

Several definitions are provided herein. A "characteristic" can be a categorical variable. An "input type" is a set of characteristics, an "input" can be a valuation of an input type (assignment of a value to each characteristic), and an "output" can be a single characteristic.

A characteristic can be defined as follows: Let L be a set of value labels. A characteristic $\chi$ over L is a variable that can take on the values in L.

An input type and input can be defined as follows: For all $n \in \mathbb{N}$, let $L_1, L_2, \ldots, L_n$ be sets of value labels. Then an input type X over those value labels is a sequence of characteristics $X = \langle \chi_1, \chi_2, \ldots, \chi_n \rangle$, where for all $1 \leq n$, $\chi_i$ is a characteristic over $L_i$.

An input of type X is $k = \langle l_1 \in L_1, l_2 \in L_2, \ldots, l_n \in L_n \rangle$, a valuation of an input type.

The sizes of input k and of input type X are n.

Discrimination can be measured in a system under test that makes decisions. When the output characteristic is binary (e.g., "give loan" vs. "do not give loan"), the significance of the two different output values is clear. When outputs are not binary, identifying potential discrimination requires understanding the significance of differences in the output. For example, if the system under test outputs an ordering of hotel listings (that may be influenced by the computer type being used, for example), domain expertise may be needed to compare two outputs and decide the degree to which the difference is significant. An "output domain distance function" can encode this expertise, mapping pairs of output values to a distance measure.

An output domain distance function can be defined as follows: Let $L_o$ be a set of value labels. Then for all $l_{o1}, l_{o2} \in L_o$, the output distance function is $\delta: L_o \times L_o \to [0 \ldots 1]$ such that $l_{o1} = l_{o2} \delta(l_{o1}, l_{o2}) = 0$.

The output domain distance function can be used to generalize beyond binary outputs. For simplicity of explanation, examples are described with respect to outputs as binary decisions. While true or false outputs (corresponding to decisions such as "give loan" vs. "do not give loan") assist with ease of understanding, the output domain distance function enables comparing non-binary outputs in two ways. First, a "threshold" output domain distance function can determine when two outputs are dissimilar enough to warrant potential discrimination. Second, a "relational" output domain distance function can describe how different two inputs are and how much they contribute to potential discrimination. Embodiments can be extended to handle non-binary outputs by changing exact output comparisons to fractional similarity comparisons using an output domain distance function, for example.

Decision software can be defined as follows: Let $n \in \mathbb{N}$ be an input size, let $L_1, L_2, \ldots, L_n$ be sets of value labels, let $X = \langle \chi_1, \chi_2, \ldots, \chi_n \rangle$ be an input type, and let $K$ be the set of all possible inputs of type $X$. Decision software is a function $\mathbb{S}: K \to \{true, false\}$. That is, when software $\mathbb{S}$ is applied to an input $\langle l_1 \in L_1, l_2 \in L_2, \ldots, l_n \in L_n \rangle$, it produces true or false.

The group discrimination score varies from 0 to 1 and measures the difference between fractions of input groups that lead to the same output (e.g., the difference between the fraction of green and purple individuals who are given a loan). This definition is based on a CV score, which is limited to a binary input type or a binary partitioning of the input space. The definition can be extended to more broad categorical input types, reflecting the relative complexity of arbitrary decisions by a system under test that includes decision software. The group discrimination score with respect to a set of input characteristics is the maximum frequency with which the system under test outputs true minus the minimum such frequency for the groups that only differ in those input characteristics. Because a CV score is limited to a single binary partitioning, that difference represents all the encoded discrimination information in that setting. In a more general setting with multiple non-binary characteristics, the score can focus on the range—difference between the maximum and minimum—as opposed to the distribution. Measurement of the standard deviation of the distribution of frequencies can be made instead, which may better measure deviation from a completely fair algorithm, as opposed to the maximal deviation for two extreme groups.

A univariate group discrimination score $\hat{d}$ can be defined as follows: Let $K$ be the set of all possible inputs of size $n \in \mathbb{N}$ of type $X = \langle \chi_1, \chi_2, \ldots, \chi_n \rangle$ over label values $L_1, L_2, \ldots, L_n$. Let software: $K \to \{true, false\}$. For all $i \leq n$, fix one characteristic $\chi_i$. That is, let $m = |L_i|$ and for all $\hat{m} \leq m$, let $K_{\hat{m}}$ be the set of all inputs with $\chi_i = L_{\hat{m}}$. ($K_{\hat{m}}$ is the set of all inputs with the $\chi_i$th characteristic fixed to be $L_{\hat{m}}$.) Let $p_{\hat{m}}$ be the fraction of inputs $k \in K_{\hat{m}}$ such that $\mathbb{S}(k) = true$. And let $P = \langle p_1, p_2, \ldots, p_m \rangle$. Then the univariate group discrimination score with respect to $\chi_i$, denoted $\hat{d}_{X_i}(\mathbb{S})$, is max $(P)$ − min $(P)$.

For example, consider loan software that decided to give a loan to 23% of green individuals, and to 65% of purple individuals. When computing loan's group discrimination score with respect to race, $\hat{d}_{race}$ (loan) = 0.65 − 0.23 = 0.42.

A multivariate group discrimination score generalizes the univariate version to multiple input characteristics. A multivariate group discrimination score $\hat{d}$ can be defined as follows: For all $\alpha, \beta, \ldots, \gamma \leq n$, fix the characteristics $\chi_\alpha, \chi_\beta, \ldots, \chi_\gamma$. That is, let $m_\alpha = |L_\alpha|, m_\beta = |L_\beta|, \ldots, m_\gamma = |L_\gamma|$, let $\hat{m}_\alpha \leq m_\alpha, \hat{m}_\beta \leq m_\beta, \ldots, \hat{m}_\gamma \leq m_\gamma$, and $m = m_\alpha \times m_\beta \times \ldots \times m_\gamma$, let $K_{\hat{m}_\alpha, \hat{m}_\beta, \ldots, \hat{m}_\gamma}$ be the set of all inputs with $\chi_\alpha = l_{\hat{m}_\alpha}, \chi_\beta = l_{\hat{m}_\beta}, \ldots, \chi_\gamma = l_{\hat{m}_\gamma}$. ($K_{\hat{m}_\alpha, \hat{m}_\beta, \ldots, \hat{m}_\gamma}$ is the set of all inputs with the $\chi_\alpha$ characteristic fixed to be $l_{\hat{m}_\alpha}, \chi_\beta$ characteristic fixed to be $l_{\hat{m}_\beta}$ and so on.) Let $p_{\hat{m}_\alpha, \hat{m}_\beta, \ldots, \hat{m}_\gamma}$ be the fraction of inputs $k \in K_{\hat{m}_\alpha, \hat{m}_\beta, \ldots, \hat{m}_\gamma}$ such that $\mathbb{S}(k) = true$. And let $P$ be an unordered sequence of all $p_{\hat{m}_\alpha, \hat{m}_\beta, \ldots, \hat{m}_\gamma}$. Then the multivariate group discrimination score with respect to $\chi_\alpha, \chi_\beta, \ldots, \chi_\gamma$, denoted $\hat{d}_{\chi_\alpha, \chi_\beta, \ldots, \chi_\gamma}(\mathbb{S})$ is max $(P)$ − min $(P)$.

As disclosed herein a "causal discrimination score" is a stronger measure of discrimination, as it seeks out causality in software, measuring the fraction of inputs for which changing specific input characteristics causes the output to change. The causal discrimination score identifies changing which characteristics directly affects the output. As a result, for example, while the group and apparent discrimination scores penalize software that gives loans to different fractions of individuals of different races, the causal discrimination score penalizes software that gives loans to individuals of one race but not to otherwise identical individuals of another race.

A multivariate causal discrimination score $\vec{d}$ can be defined as follows: Let $K$ be the set of all possible inputs of size $n \in \mathbb{N}$ of type $X = \chi_1, \chi_2, \ldots, \chi_n$ over label values $L_1, L_2, \ldots, L_n$. Let software: $K \to \{true, false\}$. For all $\alpha, \beta, \ldots, \gamma \leq n$, let $\chi_\alpha, \chi_\beta, \ldots, \chi_\gamma$ be input characteristics. Then the causal discrimination score with respect to $\chi_\alpha, \chi_\beta, \ldots, \chi_\gamma$, denoted $\vec{d}_{\chi_\alpha, \chi_\beta, \ldots, \chi_\gamma}(\mathbb{S})$ is the fraction of inputs $k \in K$ such that there exists an input $k' \in K$ such that $k$ and $k'$ differ only in the input characteristics $\chi_\alpha, \chi_\beta, \ldots, \chi_\gamma$, and $\mathbb{S}(k) \neq \mathbb{S}(k')$. That is, the causal discrimination score with respect to $\chi_\alpha, \chi_\beta, \ldots, \chi_\gamma$ is the fraction of inputs for which changing at least one of those characteristics causes the output to change.

Measured discrimination of the full input domain can include considering every possible input with every value of every characteristic. However, input domains may be partial. An operator of a system under test may, for example, care about whether the system under test discriminates only with respect to users of the system under test. "Apparent discrimination" captures this notion, applying a group or causal discrimination score measurement to a subset of the input domain, which can be described by an operational profile.

A multivariate apparent discrimination score can be defined as follows: Let $\breve{K} \subseteq K$ be a subset of the input domain to $\mathbb{S}$. Then the apparent group discrimination score is the group discrimination score applied to $\breve{K}$, and the apparent causal discrimination score is the causal discrimination score applied to $\breve{K}$ (as opposed to applied to the full $K$).

A discrimination checking problem can be defined as follows: Given an input type $X$, decision software $\mathbb{S}$ with input type $X$, and a threshold $0 \leq \theta \leq 1$, compute all $X' \subseteq X$ such that $\hat{d}_{X'}(\mathbb{S}) \geq \theta$ or $\vec{d}_{X'}(\mathbb{S}) \geq \theta$.

Figure 1:
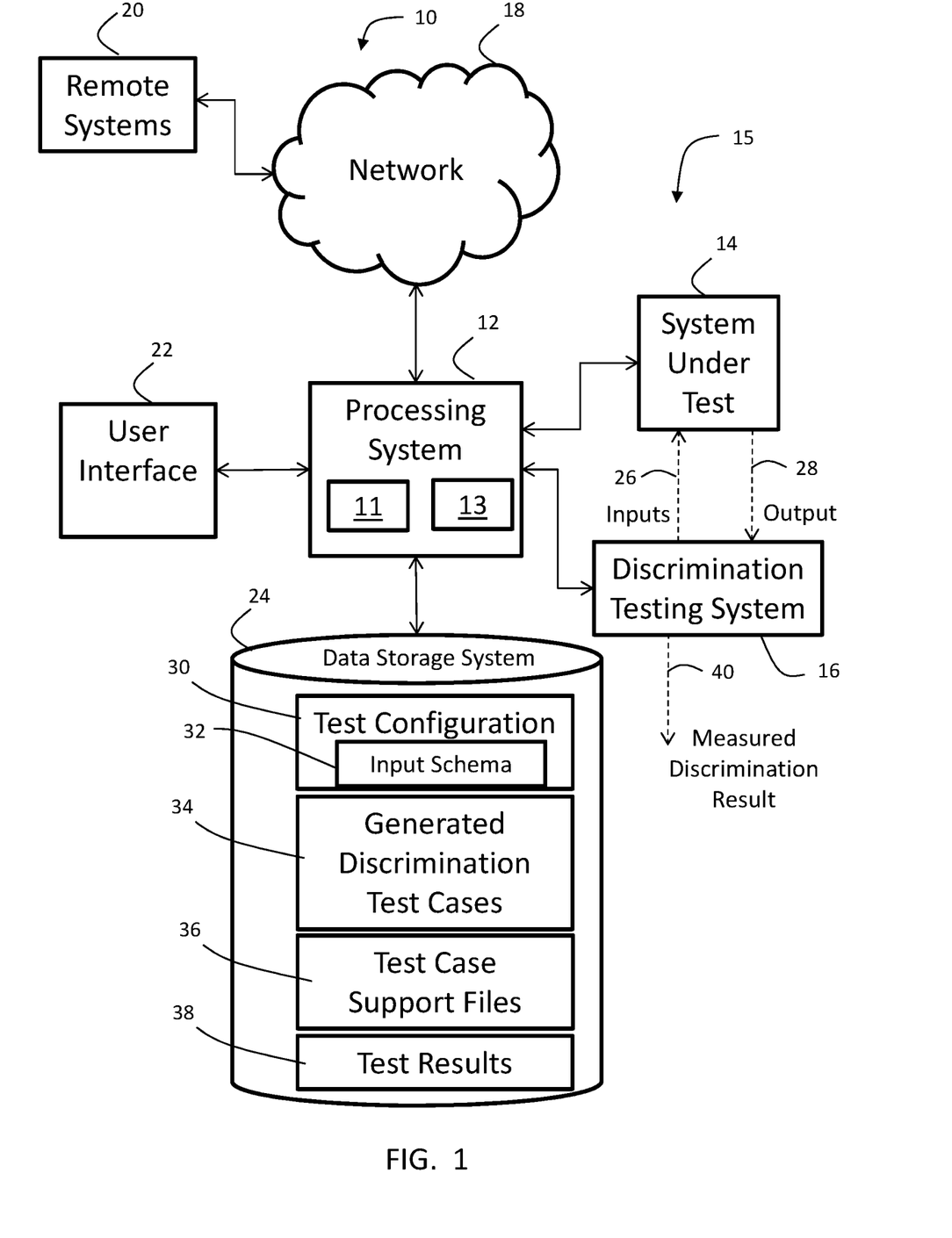
FIG. 1 illustrates a system in accordance with one or more embodiments.

Turning now to the figures, FIG. 1 depicts an example of a system 10 for performing efficient software testing according to embodiments. The system 10 includes a processing system 12 that may include one or more processors 11 and a memory system 13 operable to execute software instructions embodied in one or more applications 15, such as a system under test 14 (e.g., decision software $\mathbb{S}$) and a discrimination testing system 16. The processing system 12 may be single computer system such as a workstation, a personal computer, a laptop computer, a tablet computer, or the like. Alternatively, the processing system 12 can be distributed between multiple computing devices such as a mainframe, a cloud-based computing system, or other type of processing resources including one or more networked devices. For example, the system under test 14 can be accessible through a network 18 by one or more remote systems 20 and/or the discrimination testing system 16 can be accessible through the network 18 by one or more remote systems 20. In some embodiments, the system under test 14 and/or the discrimination testing system 16 are transferred from the remote systems 20 to the processing system 12 for local test case generation and execution to reduce traffic and latency on the network 18 and enhance testing efficiency of the system under test 14.

A user interface 22 can be provided to interact with the processing system 12, such as one or more of a keyboard, a mouse or pointer device, a camera, speakers, a microphone, a video display, and/or a touch-sensitive display. A data storage system 24 can be used to store a number of artifacts that are used, generated, and/or modified by the discrimination testing system 16 in support of performing discrimination testing of the system under test 14.

As previously described, discrimination testing can determine statistical causation between inputs 26 of the system under test and at least one output 28 of the system under test 14. Through test configuration files 30, test case support files 36, and/or through direct entry via user interface 22, a test configuration for the system under test 14 can include setting a desired confidence level, an acceptable error bound, and an input schema 32 describing the format of valid inputs. In embodiments, the discrimination testing system 16 can generate a plurality of discrimination test cases 34 (also referred to as a test suite) to compute a group or causal discrimination score for a particular set of characteristics as inputs 26 to the system under test 14. For example, the discrimination testing system 16 can be used to check if, and how much, the system under test 14 discriminates against a pair of characteristics, such as race and age. Given a discrimination threshold, the discrimination testing system 16 can generate the discrimination test cases 34 to compute all sets of characteristics against which the system under test 14 group or causally discriminates more than that threshold.

Given the discrimination test cases 34 or an operational profile describing an input distribution (for instance, within the test case support files 36), the discrimination testing system 16 can compute an apparent group or causal discrimination score for a particular set of characteristics. For example, the discrimination testing system 16 can check if the system under test 14 discriminates against race on a specific population of inputs representative of the way the system under test 14 is expected to be used. Results of each execution of the system under test 14 using one of the discrimination test cases 34 as the inputs 26 can be captured by recording the output 28 in test results 38. As multiple test results 38 are collected, the discrimination testing system 16 can analyze the test results 38 to determine a measured discrimination result 40.

The values in the discrimination test cases 34 can be randomly generated as bounded by definitions in the input schema 32. For example, the input schema 32 can bound an input characteristic as a value between a range of numbers, a value selected from a predefined group of elements, or other such constraints. In some embodiments, the test case support files 36 can include a collection of images where the input schema 32 defines image features for identification. Further, the test case support files 36 can include a collection of audio files where the input schema 32 defines a range of audio characteristics. In some embodiments, variations to audio, images, and/or video can be dynamically generated by the discrimination testing system 16 to produce the discrimination test cases 34. For instance, the discrimination testing system 16 can apply a filter or transfer function to alter the relative sharpness/blurriness of an image, perform a rescaling in time or space of audio or image files (e.g., to change the resolution), perform an re-quantization of sample data captured in an audio or image file, apply a noise function, overlay multiple audio or image files, and/or perform other modifications known in the art.

Generating test suites to measure causal discrimination with respect to a set of attributes may require manipulating test inputs to create pairs of inputs that vary only in those attributes. This process can be straightforward for inputs comprising entirely of categorical attributes, such as loan applications, but more complex for systems with complex input schemas, such as systems whose inputs are image data (e.g., photographs or other types of digitized images) or natural language data (e.g., text or audio data in a natural language format as typically spoken or written by a human). Examples of such systems include facial recognition systems and automated translation engines.

Input manipulation for some image-based systems, such as ones whose inputs are structured diagrams, can be specified via a diagram-manipulation schema that describes constraints on valid diagrams. Manipulations of more complex image inputs, such as photographs, can be learned using generative adversarial networks (GANs) or other techniques known in the art. Such manipulations learn from training data with the differences between classes of images defined by variations in an attribute and using these learned differences to transform new images.

Manipulating inputs for natural-language-based systems may require performing style transfer on the inputs. Much like translating between two languages, inputs can be translated to vary attributes. For example, a sentence said by a man may be translated into a sentence with the same semantics said by a woman. Learning such translations can require learning the differences between large corpora of sentences said by men and women and applying them to other sentences.

Measuring group and causal discrimination exactly requires exhaustive testing, which can be infeasible for nontrivial software systems. Solving the discrimination checking problem may require measuring discrimination over all possible subsets of characteristics to find those that exceed a certain discrimination threshold. The discrimination testing system 16 can address these challenges by employing multiple optimizations, such as test caching, adaptive and confidence-driven sampling, and pruning. These optimizations reduce the number of test cases needed to compute both group and causal discrimination.

The discrimination testing system 16 can compute multivariate group and causal discrimination scores with respect to a set of characteristics, which may be defined in the input schema 32. Precisely computing the group and causal discrimination scores typically requires executing a large set of tests. However, a large portion of the computation is repetitive. Tests relevant to group discrimination are also relevant to causal discrimination, and tests relevant to one set of characteristics can also be relevant to another set. This redundancy in fairness testing can allow the discrimination testing system 16 to exploit caching to reuse a portion of the test results 38 without re-executing tests. Test caching can lower storage overhead and offers significant runtime gains, thus increasing the efficiency of operations performed by the processing system 12.

Since exhaustive testing is infeasible, the discrimination testing system 16 can compute approximate group and causal discrimination scores through sampling. Sampling in the discrimination testing system 16 can be adaptive, using the ongoing score computation to determine if a specified margin of error E with a desired confidence level conf has been reached. The discrimination testing system 16 can generate inputs uniformly at random using the input schema 32, and maintains the proportion of samples (p) for which the software outputs true (e.g., from a Group Discrimination process 100 of FIG. 2) or for which the system under test 14 changes its output 28 (e.g., as determined by a Causal Discrimination process 200 of FIG. 3). The margin of error for p can be computed as:

$$error = z* \sqrt{\frac{p(1-p)}{r}},$$

where r is the number of samples so far and z* is the normal distribution z* score for the desired confidence level. The discrimination testing system 16 returns if error<∈, or generates another test otherwise.

Figure 2:
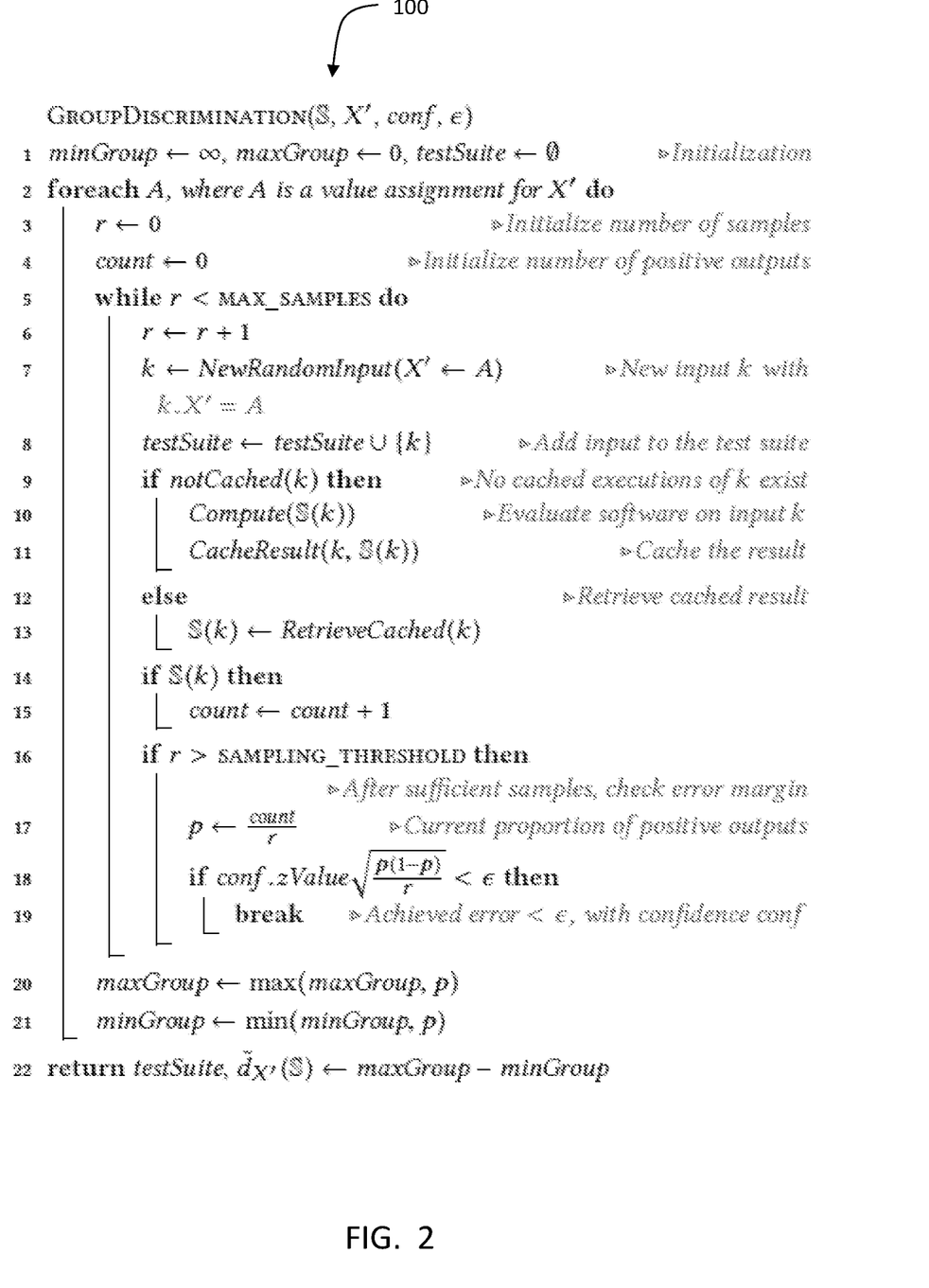
FIG. 2 illustrates a group discrimination determination process in accordance with one or more embodiments.

The Group Discrimination process 100 of FIG. 2 measures the group discrimination score with respect to a subset of its input characteristics X' and returns a group discrimination score with respect to X' with a confidence and error margin. The Group Discrimination process 100 fixes X' to particular values (line 3) to compute what portion of all tests with X' values fixed produce a true output. A while loop (line 5) generates random input assignments for the remaining input characteristics (line 7), stores them in the discrimination test cases 34, and measures a count of positive outputs. The process 100 executes the test, if that execution is not already cached in test results 38 (line 9); otherwise, the process 100 retrieves the result from the test results 38 (line 12) rather than from the output 28 of the system under test 14. After passing the minimum sampling threshold (line 16), the process 100 checks if ∈ error margin is achieved with the desired confidence (line 18). If it is, the process 100 terminates the computation for the current group and updates the max and min values (lines 20-21).

The Causal Discrimination process 200 of FIG. 3 can similarly apply test caching and adaptive sampling and returns a causal discrimination score with respect to X' with a confidence and error margin. The process 200 takes a random test $k_0$ (line 4) and tests if changing any of its X' characteristics changes the output 28 of the system under test 14. If $k_0$ result is not cached (line 6), the process 200 executes it and caches the result in test results 38. The process 200 then iterates through tests k that differ from $k_0$ in one or more characteristics in X' (line 11). All generated inputs can be stored in the discrimination test cases 34. The process 200 may only need to examine a small number of tests before discovering causal discrimination for the particular input (line 18). In the end, the process 200 returns the proportion of tests for which the process 200 found causal discrimination (line 25).

Measuring software discrimination can involve executing the Group Discrimination process 100 and the Causal Discrimination process 200 over each subset of the input characteristics. The number of these executions typically grows exponentially with the number of characteristics. In embodiments, the discrimination testing system 16 performs a pruning optimization to dramatically reduce the number of evaluated characteristics subsets. Pruning can be based on a fundamental monotonicity property of group and causal discrimination: if the system under test 14 (software $\mathbb{S}$) discriminates over threshold θ with respect to a set of characteristics X', then $\mathbb{S}$ also discriminates over threshold θ with respect to all superset of X'. Once the discrimination testing system 16 discovers that $\mathbb{S}$ discriminates against X', it can prune testing all supersets of X'.

Figure 4:
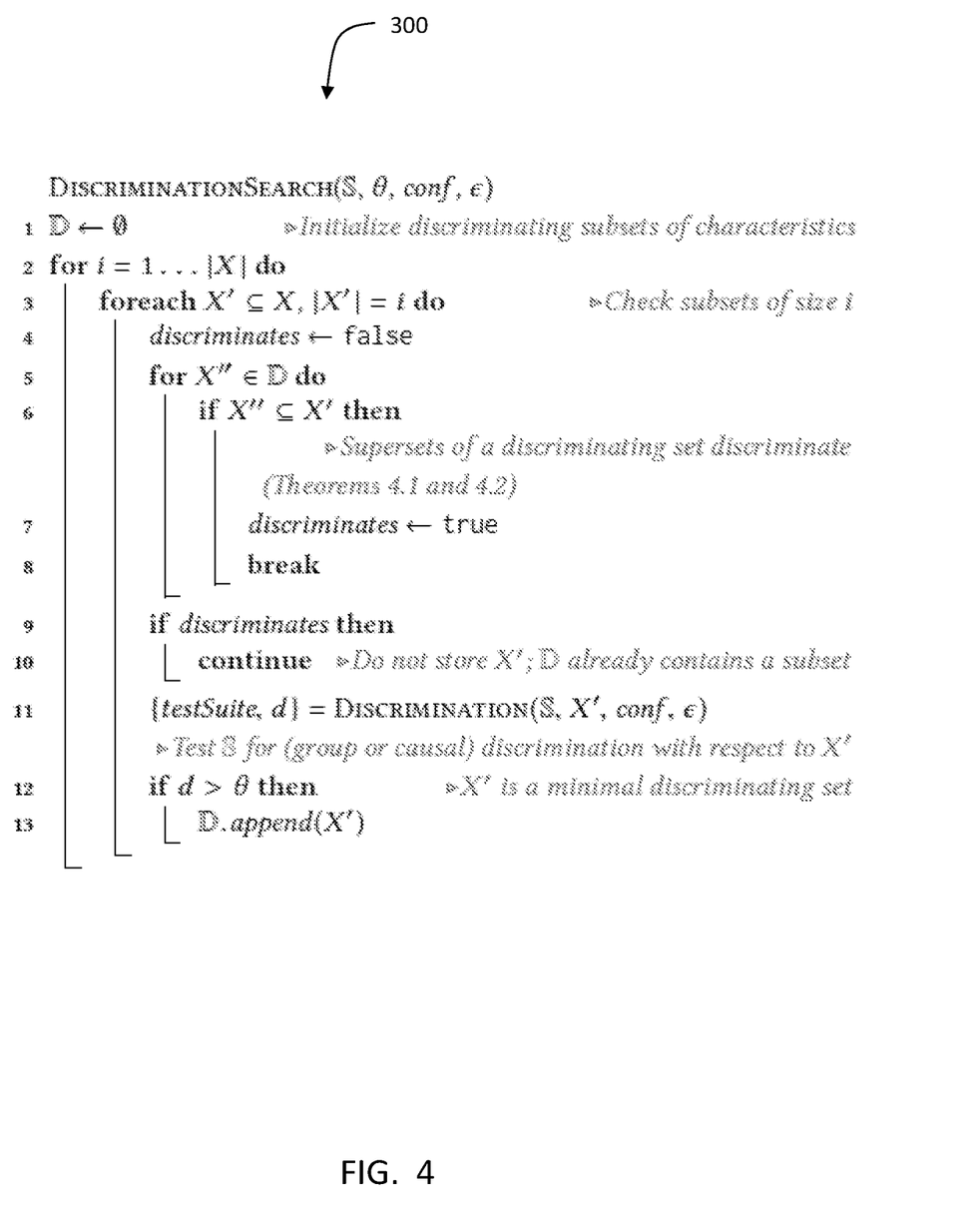
FIG. 4 illustrates a discrimination search process in accordance with one or more embodiments.

A Discrimination Search process 300 of FIG. 4 uses pruning in solving a discrimination checking problem. Pruning can lead to, on average, a two-to-three order of magnitude reduction in the number of discrimination test cases 34 needed. The Discrimination Search process 300 can identify minimal subsets of characteristics X'⊆X such that the (group or causal) discrimination score of the system under test 14 with respect to X' is greater than θ with a confidence and error margin.

Group discrimination monotonicity (theorem 4.1) can be defined as follows: Let X be an input type and let $\mathbb{S}$ be a decision software with input type X. Then for all sets of characteristics X', X"⊆X, X"⊇X'⋅$\tilde{d}_{X"}(\mathbb{S})$≥$\tilde{d}_{X'}(\mathbb{S})$.

Proof. Let $\tilde{d}_{X'}(\mathbb{S})$=θ'. To compute $\tilde{d}_{X'}(\mathbb{S})$, the space of all inputs is partitioned into equivalence classes such that all elements in each equivalence class have identical value labels assigned to each characteristic in X', then, the frequencies are computed with which inputs in each equivalence class lead $\mathbb{S}$ to a true output, and the difference between the minimum and maximum of these frequencies is computed. Let $\hat{p}'$ and $\check{p}'$ or be the maximum and minimum frequencies, and $\hat{K}'$ and $\check{K}'$ be the corresponding equivalence classes of inputs.

Consider the computation of θ"=$\tilde{d}_{X"}(\mathbb{S})$. Note that the equivalence classes of inputs for this computation will be strict subsets of the equivalence classes in the θ' computation. In particular, the equivalence subset $\hat{K}'$ will be split into several equivalence classes, which are referred to as $\hat{K}"_1$, $\hat{K}"_2$, . . . . There are two possibilities: (1) either the frequency with which the inputs in each of these subclasses lead $\mathbb{S}$ to a true output equal the frequency of $\hat{K}'$, or (2) some subclasses have lower frequencies and some have higher than $\hat{K}'$ (since when combined, they must equal that of $\hat{K}'$). Either way, the maximum frequency of the $\hat{K}"_1$, $\hat{K}"_2$, . . . , $\hat{K}"_j$ subclasses is ≥$\hat{K}'$. And therefore, the maximum overall frequency $\hat{p}"$ for all the equivalence classes in the computation of θ" is ≥$\hat{p}'$. Similarly, the minimum overall frequency $\check{p}"$ for all the equivalence classes in the computation of θ" is ≤$\check{p}'$. Therefore, θ"=($\hat{p}"-\check{p}"$)≥($\hat{p}'-\check{p}'$)≤=θ', and therefore, X"⊇X'⋅$\tilde{d}_{X"}(\mathbb{S})$≥$\tilde{d}_{X'}(\mathbb{S})$.

Causal discrimination monotonicity (theorem 4.2) can be defined as follows: Let X be an input type and let S be a decision software with input type X. Then for all sets of characteristics X', X"⊆X, X"⊇X'⋅$\vec{d}_{X"}(\mathbb{S})$≥$\vec{d}_{X'}(\mathbb{S})$. The causal discrimination score with respect to X' is the fraction of inputs for which changing the value of at least one characteristic in X' changes the output. Consider K', the entire set of such inputs for X', and similarly K", the entire set of such inputs for X". Since X"⊇X', every input in K' must also be in K" because if changing at least one characteristic in X' changes the output and those characteristics are also in X". Therefore, the fraction of such inputs must be no smaller for X" than for X', and therefore, X"⊇X'⋅$\vec{d}_{X"}(\mathbb{S})$≥$\vec{d}_{X'}(\mathbb{S})$.

A further opportunity for pruning comes from the relationship between group and causal discrimination. If the system under test 14 group discriminates against a set of characteristics, it must causally discriminate against that set at least as much. Let X be an input type and let $\mathbb{S}$ be a decision software with input type X. Then for all sets of characteristics X'⊆X, $\tilde{d}_{X'}(\mathbb{S})$≤$\vec{d}_{X'}(\mathbb{S})$.

Proof. Let $\tilde{d}_{X'}(\mathbb{S})=\theta$. To compute $\tilde{d}_{X'}(\mathbb{S})$, the space of all inputs is partitioned into equivalence classes such that all elements in each equivalence class have identical value labels assigned to each characteristic in X'. The same equivalence class inputs have same values for characteristics in X' and the ones in different equivalence classes differ in at least one of the characteristics in X'.

Here, $\tilde{d}_{X'}(\mathbb{S})=\theta$ means that for $\theta$ fraction of inputs, the output is true, and after changing just some values of X' (producing an input in another equivalence class), the output is false. This is because if there were $\theta'<\theta$ fraction of inputs with a different output when changing the equivalence classes, then $\tilde{d}_{X'}(\mathbb{S})$ would have been $\theta'$. Hence $\vec{d}_{X'}(\mathbb{S})>\theta$.

Pruning greatly reduces the number of tests needed to compute both group and causal discrimination. The more that the system under test 14 discriminates, the more effective pruning is, making the discrimination testing system 16 more efficient because pruning happens when small sets of characteristics discriminate above the chosen threshold. Such sets enable pruning away larger supersets of characteristics.

Pruning monotonicity can be defined as follows: Let X be an input type and $\mathbb{S}$ and $\mathbb{S}'$ be decision software with input types X. If for all X'⊆X, $\vec{d}_{X'}(\mathbb{S}) \geq \vec{d}_{X'}(\mathbb{S}')$ (respectively, $\tilde{d}_{X'}(\mathbb{S}') \geq \tilde{d}_{X'}(\mathbb{S}')$), then for all X"⊆X, if the discrimination testing system 16 can prune X" when computing Discrimination Search($\mathbb{S}'$, θ, conf, ∈) process 300, then it can also prune X" when computing Discrimination Search($\mathbb{S}$, θ, conf, ∈) process 300.

For the discrimination testing system 16 to prune X" when computing Discrimination Search($\mathbb{S}'$, θ, conf, ∈) process 300, there must exist a set $\hat{X}"⊊X"$ such that $\vec{d}_{\hat{X}"}(\mathbb{S}') \geq \theta$. Since $\vec{d}_{\hat{X}"}(\mathbb{S}) \geq \vec{d}_{\hat{X}"}(\mathbb{S}')>\theta$, when computing Discrimination Search(S, 9, conf) process 300, the discrimination testing system 16 can also prune X". The same holds for group discrimination $\tilde{d}$. This effect can be observed by measuring pruning while decreasing the discrimination threshold θ; decreasing θ effectively simulates increasing system discrimination. It has been illustrated that pruning increases when θ decreases (or equivalently, when discrimination increased). In one example, the discrimination testing system 16 needed 3,413 tests to find sets of characteristics that discriminated with a score of more than θ=0.7, but only 10 tests when r θ was reduced to 0.6. Similarly, the number of tests for in another example dropped from 920 to 10 when lowering θ from 0.6 to 0.5. This illustrates that the discrimination testing system 16 can be more efficient when the benefits of fairness testing increase because the system under test 14 discriminates more.

Figure 5:
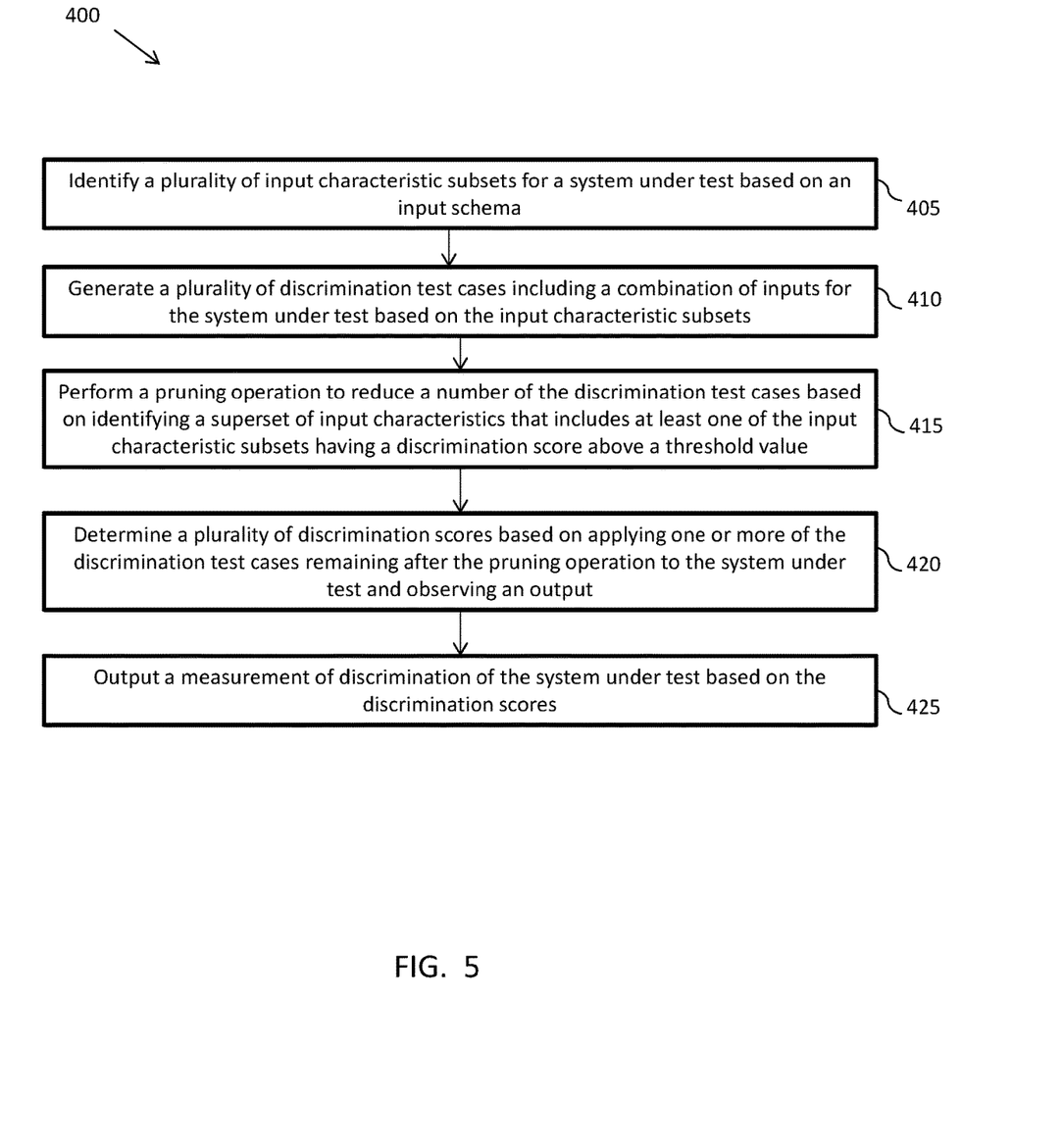
FIG. 5 illustrates a software system testing process in accordance with one or more embodiments.

FIG. 5 depicts an example process 400 according to an embodiment, and need not be performed in the order as depicted. The process 400 is described in reference to FIGS. 1-5 and can include additional steps.

At block 405, the discrimination testing system 16 identifies a plurality of input characteristic subsets for a system under test 14 based on an input schema 32. The input schema 32 can describe a format of valid inputs to the system under test 14. For example, the format of valid inputs of the input schema 32 can include one or more image formats. As another example, the format of valid inputs of the input schema 32 can include one or more natural language formats. Other combinations of text, audio data, video data, and various types of encoded formats may also be supported.

At block 410, the discrimination testing system 16 generates a plurality of discrimination test cases 34 including a combination of inputs 26 for the system under test 14 based on the input characteristic subsets. The discrimination testing system 16 can randomly generate one or more values of inputs 26 for the system under test 14 based on the input schema 32 to generate the discrimination test cases 34.

At block 415, the discrimination testing system 16 performs a pruning operation (e.g., process 300) to reduce a number of the discrimination test cases 34 based on identifying a superset of input characteristics that includes at least one of the input characteristic subsets having a discrimination score above a threshold value.

At block 420, the discrimination testing system 16 determines a plurality of discrimination scores based on applying one or more of the discrimination test cases 34 remaining after the pruning operation as inputs 26 to the system under test 14 and observing an output 28. The discrimination scores can be determined based on applying a group discrimination process 100 that determines a difference between maximum and minimum frequencies of an output 28 of the system under test 14 having a predetermined value when applying a fixed value to one of the input characteristics. Alternatively or in combination, the discrimination scores can be determined based on applying a causal discrimination process 200 that identifies a fraction of the input characteristics in which changing at least one of the input characteristics causes the output 28 of the system under test 14 to change values. In some embodiments, the discrimination scores are determined with respect to a confidence value and an error margin, and the discrimination scores can be determined using adaptive confidence-driven sampling based on the confidence value and the error margin.

At block 425, the discrimination testing system 16 outputs a measurement of discrimination 40 of the system under test 14 based on the discrimination scores.

In some embodiments, the discrimination testing system 16 can store the output 30 of applying the one or more of the discrimination test cases 34 to the system under test 14 as a plurality of test results 38. The discrimination testing system 16 can compare a newly generated discrimination test case to one or more previously generated discrimination test case. Based on identifying a match between the newly generated discrimination test case and the one or more previously generated discrimination test cases, the discrimination testing system 16 can retrieve a corresponding value of a discrimination score from the test results 38 to avoid repeating execution of the system under test 14 with a previously executed test case.

Technical effects and benefits can include automated efficient test case generation for a system under test that reduces total testing time and identifies causal discrimination between inputs to the system under test and one or more outputs of the system under test.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A system comprising:
a memory system having computer readable instructions; and
one or more processors for executing the computer readable instructions, the computer readable instructions including:
identifying a plurality of input characteristic subsets for a system under test based on an input schema;
generating a plurality of discrimination test cases comprising a combination of inputs for the system under test based on the input characteristic subsets;
performing a pruning operation to reduce a number of the discrimination test cases based on identifying a superset of input characteristics that includes at least one of the input characteristic subsets having a discrimination score above a threshold value;
determining a plurality of discrimination scores based on applying one or more of the discrimination test cases remaining after the pruning operation to the system under test and observing an output, wherein the discrimination scores are determined based on applying a group discrimination process, applying a causal discrimination process, or using adaptive confidence-driven sampling; and
outputting a measurement of discrimination of the system under test based on the discrimination scores.

2. The system of claim 1, wherein the input schema describes a format of valid inputs to the system under test.

3. The system of claim 2, wherein the format of valid inputs of the input schema comprises one or more image formats.

4. The system of claim 2, wherein the format of valid inputs of the input schema comprises one or more natural language formats.

5. The system of claim 1, wherein the group discrimination process determines a difference between maximum and minimum frequencies of an output of the system under test having a predetermined value when applying a fixed value to one of the input characteristics.

6. The system of claim 1, wherein the causal discrimination process identifies a fraction of the input characteristics in which changing at least one of the input characteristics causes the output of the system under test to change values.

7. The system of claim 1, wherein generating the discrimination test cases further comprises:
randomly generating one or more values of inputs for the system under test based on the input schema;
storing the output of applying the one or more of the discrimination test cases to the system under test as a plurality of test results;
comparing a newly generated discrimination test case to one or more previously generated discrimination test cases; and
based on identifying a match between the newly generated discrimination test case and the one or more previously generated discrimination test cases, retrieving a corresponding value of a discrimination score from the test results to avoid repeating execution of the system under test with a previously executed test case.

8. The system of claim 1, wherein the discrimination scores are determined with respect to a confidence value and an error margin, and the adaptive confidence-driven sampling is based on the confidence value and the error margin.

9. A method comprising:
identifying, by a discrimination testing system executing on a processing system, a plurality of input characteristic subsets for a system under test based on an input schema;
generating, by the discrimination testing system, a plurality of discrimination test cases comprising a combination of inputs for the system under test based on the input characteristic subsets;
performing, by the discrimination testing system, a pruning operation to reduce a number of the discrimination test cases based on identifying a superset of input characteristics that includes at least one of the input characteristic subsets having a discrimination score above a threshold value;
determining, by the discrimination testing system, a plurality of discrimination scores based on applying one or more of the discrimination test cases remaining after the pruning operation to the system under test and observing an output, wherein the discrimination scores are determined based on applying a group discrimination process, applying a causal discrimination process, or using adaptive confidence-driven sampling; and
outputting, by the discrimination testing system, a measurement of discrimination of the system under test based on the discrimination scores.

10. The method of claim 9, wherein the input schema describes a format of valid inputs to the system under test.

11. The method of claim 10, wherein the format of valid inputs of the input schema comprises one or more image formats.

12. The method of claim 10, wherein the format of valid inputs of the input schema comprises one or more natural language formats.

13. The method of claim 9, wherein the group discrimination process determines a difference between maximum and minimum frequencies of an output of the system under test having a predetermined value when applying a fixed value to one of the input characteristics.

14. The method of claim 9, wherein the causal discrimination process identifies a fraction of the input characteristics in which changing at least one of the input characteristics causes the output of the system under test to change values.

15. The method of claim 9, wherein generating the discrimination test cases further comprises:
randomly generating one or more values of inputs for the system under test based on the input schema;
storing the output of applying the one or more of the discrimination test cases to the system under test as a plurality of test results;
comparing a newly generated discrimination test case to one or more previously generated discrimination test cases; and based on identifying a match between the newly generated discrimination test case and the one or more previously generated discrimination test cases, retrieving a corresponding value of a discrimination score from the test results to avoid repeating execution of the system under test with a previously executed test case.

16. The method of claim 9, wherein the discrimination scores are determined with respect to a confidence value and an error margin, and the adaptive confidence-driven sampling is based on the confidence value and the error margin.

17. A computer program product comprising a computer readable storage medium having program instructions embodied therewith, the program instructions executable by one or more processors to cause the one or more processors to perform:
- identifying a plurality of input characteristic subsets for a system under test based on an input schema;
- generating a plurality of discrimination test cases comprising a combination of inputs for the system under test based on the input characteristic subsets;
- performing a pruning operation to reduce a number of the discrimination test cases based on identifying a superset of input characteristics that includes at least one of the input characteristic subsets having a discrimination score above a threshold value;
- determining a plurality of discrimination scores based on applying one or more of the discrimination test cases remaining after the pruning operation to the system under test and observing an output, wherein the discrimination scores are determined based on applying a group discrimination process, applying a causal discrimination process, or using adaptive confidence-driven sampling; and
- outputting a measurement of discrimination of the system under test based on the discrimination scores.

18. The computer program product of claim 17, wherein the group discrimination process determines a difference between maximum and minimum frequencies of an output of the system under test having a predetermined value when applying a fixed value to one of the input characteristics.

19. The computer program product of claim 17, wherein the causal discrimination process identifies a fraction of the input characteristics in which changing at least one of the input characteristics causes the output of the system under test to change values.

20. The computer program product of claim 17, wherein generating the discrimination test cases further comprises randomly generating one or more values of inputs for the system under test based on the input schema, and the program instructions are executable to perform:
- storing the output of applying the one or more of the discrimination test cases to the system under test as a plurality of test results;
- comparing a newly generated discrimination test case to one or more previously generated discrimination test cases; and
- based on identifying a match between the newly generated discrimination test case and the one or more previously generated discrimination test cases, retrieving a corresponding value of a discrimination score from the test results to avoid repeating execution of the system under test with a previously executed test case.

* * * * *